United States Patent
Cheung et al.

(10) Patent No.: US 9,712,683 B2
(45) Date of Patent: Jul. 18, 2017

(54) COMMUNICATION AGENT METHOD

(71) Applicant: Chaatz Limited, Wan Chai (HK)

(72) Inventors: Lap Tak Richard Cheung, New Territories (HK); Wai Hon Wong, Kowloon (HK)

(73) Assignee: CHAATZ LIMITED, Wan Chai (HK)

( * ) Notice: Subject to any disclaimer, the term of this patent is extended or adjusted under 35 U.S.C. 154(b) by 347 days.

(21) Appl. No.: 14/286,705

(22) Filed: May 23, 2014

(65) Prior Publication Data

US 2015/0281946 A1    Oct. 1, 2015

(30) Foreign Application Priority Data

Apr. 1, 2014  (HK) .................................. 14103134

(51) Int. Cl.
*H04W 4/16* (2009.01)
*H04M 7/12* (2006.01)
*H04M 3/42* (2006.01)

(52) U.S. Cl.
CPC ....... *H04M 7/128* (2013.01); *H04M 3/42229* (2013.01); *H04W 4/16* (2013.01)

(58) Field of Classification Search
None
See application file for complete search history.

(56) References Cited

U.S. PATENT DOCUMENTS

| | | | | |
|---|---|---|---|---|
| 8,731,566 | B2* | 5/2014 | Xiao | H04W 8/26 455/418 |
| 2004/0111376 | A1* | 6/2004 | Kokko | G06Q 20/382 705/74 |
| 2005/0192035 | A1* | 9/2005 | Jiang | H04W 8/26 455/461 |
| 2005/0278418 | A1* | 12/2005 | Rathakrishnan | G06F 8/67 709/203 |
| 2007/0105531 | A1* | 5/2007 | Schroeder | H04M 3/42008 455/411 |
| 2009/0325635 | A1* | 12/2009 | Gass | H04W 48/18 455/552.1 |
| 2010/0255825 | A1* | 10/2010 | Bontempi | H04L 29/12594 455/414.1 |
| 2010/0298023 | A1* | 11/2010 | Jacobsohn | H04L 63/104 455/525 |
| 2011/0230177 | A1* | 9/2011 | Choi | H04M 3/42272 455/418 |

(Continued)

*Primary Examiner* — Gregory Sefcheck
*Assistant Examiner* — Jenkey Van
(74) *Attorney, Agent, or Firm* — Raymond R. Ferrera; Adams and Reese LLP

(57) ABSTRACT

A communication agent method, involving a server, a first mobile device and a second mobile device communicated with the server in wireless, the method comprising steps of: via the first mobile device, logging in the server with a MSISDN and requesting a specific number according to the MSISDN; via the server, returning the specific number binding with the MSISDN; sending an authorization message to the first mobile device for confirming, if the second mobile device request to the server for logging in the server with specific number of the first mobile device; and via the second mobile device, logging in the server with the specific number of the first mobile device, if the first mobile device confirming the authorization message.

7 Claims, 2 Drawing Sheets

(56) References Cited

U.S. PATENT DOCUMENTS

2013/0157716 A1* 6/2013 Khan ...................... H04W 4/16
455/551
2013/0225123 A1* 8/2013 Adjakple ............. G06Q 20/322
455/406

* cited by examiner

COMMUNICATION AGENT METHOD

FIELD OF THE INVENTION

The present application relates to technical field of communication, and more particularly, relates to a communication agent method.

BACKGROUND OF THE INVENTION

IP phone is a type of phone that uses internet or other network with Internet Protocol to transmit phone calls. Voice over Internet Protocol (VoIP) is an IP phone-based technology including corresponding value-added services. The VoIP, mainly featured of a low communication cost, effective construction cost, easy expandability, and better communication quality, and so on, is regarded as a strong competitor of the traditional telecom service by international telecom companies. At present, with the growing number of mobile devices used by consumers, it is difficult for consumers to manage the increasing phone numbers. Moreover, in the traditional calls, the disclosure of real phone numbers causes a lot of problems.

SUMMARY OF THE INVENTION

A communication agent method, substantially is shown in and/or described in connection with at least one of the figures, as set forth more completely in the claims, aiming at the drawbacks of difficulties in managing multiple phone numbers and the disclosure of real phone number in the prior art.

In one aspect, the communication agent method, involves a server, a first mobile device and a second mobile device communicated with the server in wireless, the method comprising steps of:

via the first mobile device, logging in the server with a Mobile Subscriber International ISDN/PSTN number (MSISDN) and requesting a specific number according to the MSISDN;

via the server, returning the specific number binding with the MSISDN;

sending an authorization message to the first mobile device for confirming, if the second mobile device requesting to the server for logging in the server with specific number of the first mobile device; and via the second mobile device, logging in the server with the specific number of the first mobile device, when the first mobile device confirming the authorization message.

In one embodiment, the step of via the first mobile device logging in the server with a MSISDN further comprising:

via the first mobile device, logging in the server with another MSISDN, requesting and generating the specific number separately according to the forgoing MSISDN and the another MSISDN, and binding the specific number to the forgoing MSISDN and the another MSISDN.

In one embodiment, the step of via the first mobile device logging another MSISDN to the server further comprising:

setting multiple phone numbers corresponding to the forgoing MSISDN and another MSISDN, and grouping the phone numbers according to the forgoing MSISDN and another MSISDN.

In one embodiment, the step of requesting a specific number according to the MSISDN that requesting a specific number according to the MSISDN further comprising:

requesting another specific number according to the MSISDN.

In one embodiment, the step of via the server returning the specific number binding with the MSISDN further comprising:

if the MSISDN has bound to the specific number in the server, the server returning the specific number binding with the MSISDN;

if the MSISDN has not bound to the specific number in the server, the server producing the specific number binding with the MSISDN, and returning the specific number.

In one embodiment, the step that the second mobile device requesting to the server for logging in the server with specific number of the first mobile device further including:

when the second mobile device requesting to the server for logging in the server with specific number of the first mobile device, the server receiving and storing a second identification message of the second mobile device, binding the specific number of the first mobile device to the second mobile device, and separating the specific number from the first mobile device.

In one embodiment, the step of sending an authorization message to the first mobile device for confirming further comprising:

via the server, checking and verifying a first identification message and the MSISDN of the first mobile device, and then sending out an authorization message to the first mobile device according to the first identification message and the MSISDN for confirming.

In one embodiment, the step of via the second mobile device logging in the server with the specific number of the first mobile device, after the first mobile device confirming the authorization message further comprising:

confirming and authorizing the server to bind the specific number to the second identification message of the second mobile device, after the first mobile device receiving the authorization message;

via the second mobile device, logging in the server with the specific number of the first mobile device.

In one embodiment, the step via the second mobile device, logging in the server with the specific number of the first mobile device, further comprising:

inputting the specific number and a security code for requesting to log in the server.

In one embodiment, the specific number is configured with a format of 10 unordered digits code following a '*', for distinguishing from the MSISDN.

When implementing communication agent method of the present disclosure, the following advantage effects can be achieved: the communication agent method enables users to register the phone number to generate a specific number, and use the specific number optionally. The specific number may be adopted to create, organize and manage multiple profiles and personas or aliases for work, family, personal, and other conversations or purposes. Meanwhile, users may forward messaging from various devices to a single, central device, so as to simplify message management from multiple devices. When making purchases on mobile, it can also provide users with one or more unique specific number which is aliases that enables them to redirect messages, so that the actual mobile number of the users' would not be acquired by others.

BRIEF DESCRIPTION OF THE DRAWINGS

The present disclosure can be further illustrated with reference to the accompanying drawings and embodiments in the following. In the Figures.

DETAILED DESCRIPTION OF THE PREFERRED EMBODIMENT

So as to further clearly explain the technique character, the object and the effect, a specific implement of the present invention will be illustrated in detail with references to the accompanying drawings.

Figure 1:
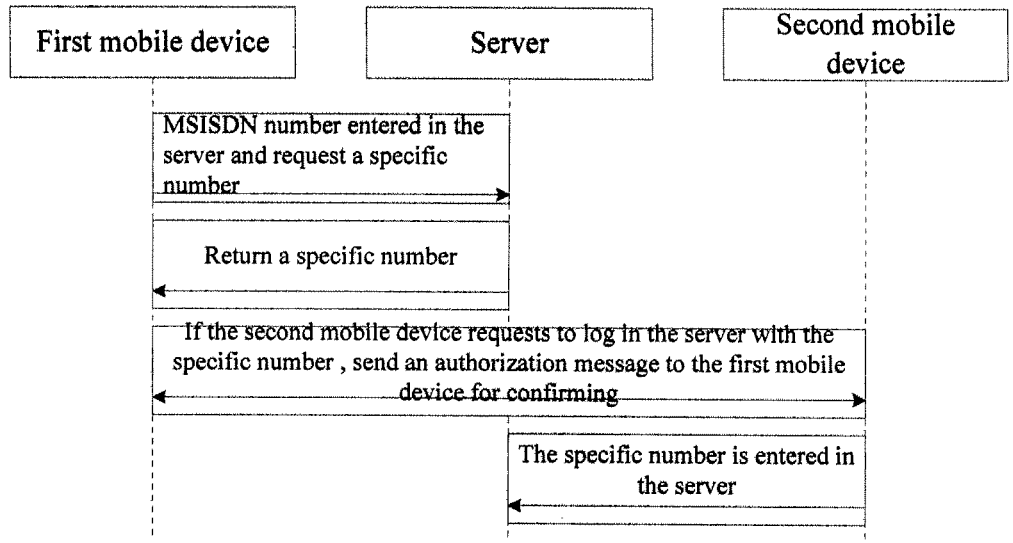
FIG. 1 is a flow chart of a communication agent method according to the present disclosure.

FIG. 1 is a flow chart of a communication agent method according to the present disclosure. Reference to FIG. 1, in the communication agent method of the disclosure, a server, a first mobile device and a second mobile device separately communicated with the server in wireless are provided. Herein, the first mobile device is a mobile phone, iPad, or the like, which is provided with a Mobile Subscriber International ISDN/PSTN number (MSISDN). The server is a high performance computer in a preset network. The server can receive a service request from the first mobile device, the second mobile device or other mobile devices with corresponding software installed, and provide a corresponding service. Thus, the server must be capable of assuming and assuring the service. In this disclosure, the server may provide a specific number, with a format of 10 unordered digit codes following a '*', such as '*1234567890'. The specific number is generated from MSISDN and binding with the MSISDN so as to distinguish from the other MSISDN. The specific number can be used for VOIP Internet phone call, as well as for achieving communication with other users provided with the specific number. During communication, it is the specific number that would be displayed to others. The second mobile device may be any mobile devices communicated with the server, or may be the same one as the first mobile device.

In the method, the step of acquiring the specific number includes following steps.

Figure 2:
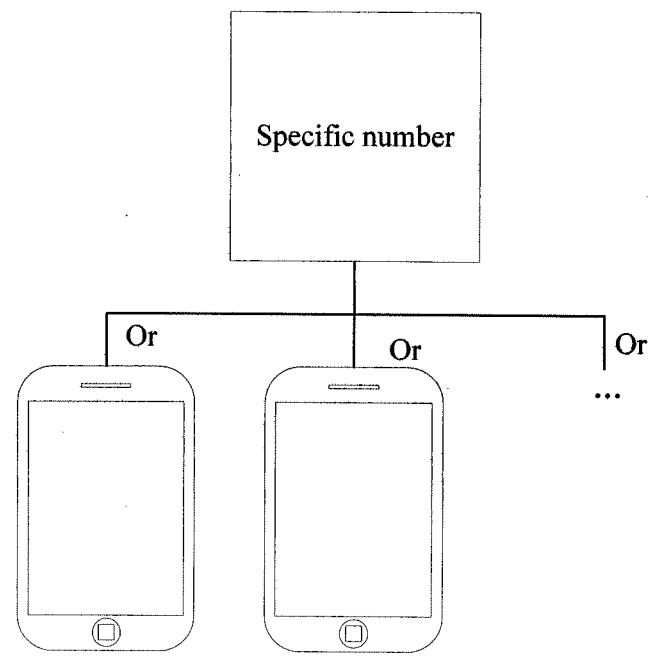
FIG. 2 illustrates a specific number binding and transferring with a plurality of mobile devices (which are not used at the same time) according to the present disclosure.

Firstly, in order to get a specific number, default software gets downloaded either from the server or from other paths. The first mobile device logs in the server with a MSISDN and request a specific number according to the MSISDN. Moreover, the first mobile device may be provided with multiple different MSISDNs at the same time. The server can produce a plurality of groups of specific number according to the different MSISDNs, and bind the groups of specific number to the different MSISDNs. As shown in FIG. 2, one specific number can be transferred to a plurality of different mobile devices. However, each specific number only can be used in one mobile device, instead of being used in two or more mobile devices at the same time.

Figure 3:
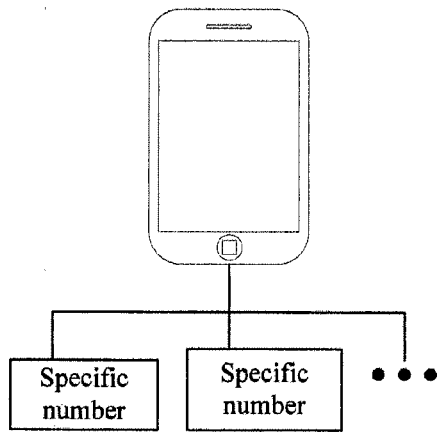
FIG. 3 illustrates a mobile device binding with a plurality of specific numbers according to the present disclosure.

Moreover, one MSISDN can request a plurality of specific numbers. As shown in FIG. 3, the advantage of the step that one MSISDN request a plurality of specific numbers is that different specific numbers for communication may be displayed according to different communicating users. Herein, the specific number can be added, replaced and removed according to users' need.

Figure 4:
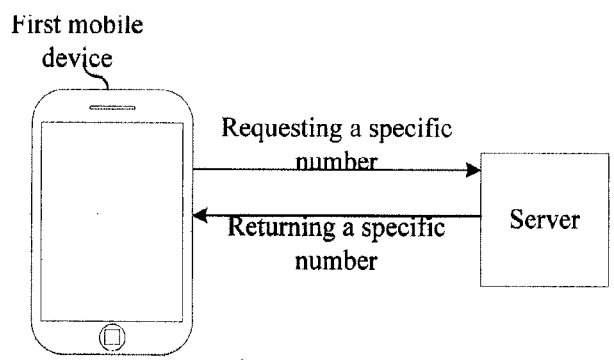
FIG. 4 is a schematic diagram of a system of obtaining a specific number according to the present disclosure.
Figure 5:
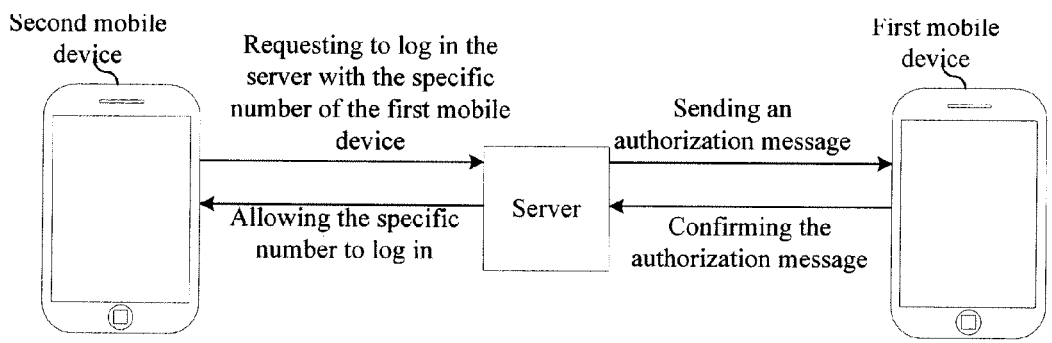
FIG. 5 is a schematic diagram of a system of entering a specific number according to the present disclosure.

The server returns the specific number binding with the MSISDN. As shown in FIG. 4, after judging whether a specific number exists in the server or not, the server returns the specific number binding with the MSISDN. If the MSISDN has bound to the specific number in the server, the server returns the specific number binding with the MSISDN. Therefore, this step can be implemented by users having requested the specific number. If the MSISDN has not yet bound to the specific number in the server, the server produces the specific number binding with the MSISDN and returns the specific number, and this step can be implemented by a user never requesting the specific number. The display part of the specific number would be displayed to users on the screen of the first mobile device after the specific number's returning, and multiple profiles and personas created, organized and managed by the specific number can be displayed on the screen. Moreover, the specific number allows users to create aliases for work, family, personal, and other conversations or purposes.

In the method, the step of using the specific number to log in the server includes the following steps:

In the first mobile device, a 'Transfer' option may be selected so as to enable other mobile devices to log in the server with the specific number. After the selection of 'Transfer', a popup dialog appears, displaying the specific number and a dialog for the second mobile device to input six digits security code.

If the specific number of the first mobile device for logging in the server is requested to the server by the second mobile device, and the specific number and the security code for requesting to log in the server has been input, an authorization message for confirming will be sent to the first mobile device, on condition that the specific number and the security code are valid, and the authorization message is sent according to The Extensible Messaging and Presence Protocol (XMPP). Herein, as the second mobile device requesting the server for the specific number of the first mobile device to log in, the server receives and stores a second identification message related to the second mobile device, and binds the specific number of the first mobile device to the second mobile device, and simultaneously the specific number is separated from the first mobile device. Herein, the first mobile device is provided with a first identification message, which is an unique ID for the related mobile device (JID), and the second identification message is a JID for the second mobile device. The above-mentioned JID is a physical address or other messages for the corresponding mobile device to differ from other mobile devices.

The specific number of the first mobile device with the authorization code is entered by the second mobile device, after the authorization from the first mobile device. Herein, after checking and verifying the first identification message and the MSISDN, the server will send out the authorization message for confirming according to the first identification message and the MSISDN to the first mobile device. The first mobile device receives the authorization message, and then an authorization popup dialog appears for the first mobile device to confirm and authorize the server to bind the specific number to the JID of the second mobile device. The second mobile device may log in the server according to the specific number. Once the first mobile device has confirmed the authorization message, the second mobile device may log in the server by the specific number alone without the MSISDN.

When implementing the technical solution in the disclosure, users can get a private way to communicate. With a proxy phone number as the specific number, it can display different MSISDNs or specific number as a local number to the contact according to the user's own choosing. It can keep users' real phone number entirely anonymous and just display the specific number. The present disclosure of the specific number can also be transferred to Non-SIM devices like tablet mobile device to achieve VoIP Internet phone calls.

While the present invention has been described by reference to preferred embodiments, it will be understood by those skilled in the art that various changes may be made and equivalents may be substituted without departing from the spirit and the scope of the present invention. However, all the changes will be included within the scope of the appended claims.

The invention claimed is:

1. A communication agent method, involving a server, a first mobile device and a second mobile device communicated with the server in wireless, the method comprising steps of:
    S1: via the first mobile device, logging in the server with a first MSISDN and requesting a first specific number according to the first MSISDN;
    S2: via the server, returning the first specific number binding with the first MSISDN;
    S3: sending a first authorization message to the first mobile device for confirming, if the second mobile device requesting for logging to the server with the first specific number of the first mobile device; and
    S4: via the second mobile device, logging in the server with the first specific number of the first mobile device, if the first mobile device confirming the first authorization message;
    wherein in step S1, the first mobile device is provided with a plurality of MSISDNs along with the first MSISDN, and the server produces and binds a plurality of specific numbers for each MSISDN; each specific number is used only in one mobile device;
    wherein in step S3, when the second mobile device requests to the server for logging in the server with first specific number of the first mobile device, the server receives and stores a second identification message of the second mobile device, binding the first specific number of the first mobile device to the second mobile device, and simultaneously separates the first specific number from the first mobile device;
    wherein in step S3, furthermore, the server checks and verifies a first identification message and the first MSISDN of the first mobile device, and then sends out a first authorization message to the first mobile device in response to the first identification message and the first MSISDN after the check and verification;
    wherein in step S4, the first mobile device receives the first authorization message, and confirms on an authorization dialog popup box on the screen of the first mobile device, and sends out a second authorization message to authorize the server to bind the first specific number to the second identification message of the second mobile device, which is stored in the server;
    wherein in step S4, furthermore, the first identification message is an unique ID (JID) for the first mobile device, and the second identification message is an unique ID (JID) for the second mobile device.

2. The communication agent method of claim 1, wherein, the step of via the first mobile device logging in the server with a first MSISDN further comprising:
    via the first mobile device, logging in the server with a second MSISDN, requesting and generating a first and a second specific number separately according to the first MSISDN and the second MSISDN, and binding the first and the second specific number respectively to the first MSISDN and the second MSISDN.

3. The communication agent method of claim 2, wherein, the step of via the first mobile device logging with a second MSISDN to the server further comprising:
    setting multiple phone numbers corresponding to the first MSISDN and the second MSISDN, and grouping the phone numbers according to the first MSISDN and the second MSISDN respectively.

4. The communication agent method of claim 1, wherein, the step of requesting a first specific number according to the first MSISDN further comprising:
    requesting a second specific number according to the MSISDN.

5. The communication agent method of claim 1, wherein, the step of via the server returning the first specific number binding with the first MSISDN further comprising:
    if the first MSISDN has bound to the first specific number in the server, the server returning the first specific number binding with the first MSISDN;
    if the first MSISDN has not bound to the first specific number in the server, the server producing the first specific number binding with the first MSISDN, and returning the first specific number.

6. The communication agent method of claim 1, wherein, the step via the second mobile device, logging in the server with the first specific number of the first mobile device, further comprising :
    inputting the first specific number and a security code for requesting to log in the server.

7. The communication agent method of claim 1, wherein, the first specific number is configured with a format of 10 unordered digits code following a '*', for distinguishing from the first MSISDN.

* * * * *